United States Patent [19]
Schwarz

[11] Patent Number: 5,980,380
[45] Date of Patent: Nov. 9, 1999

[54] VENTILATION UNIT

[75] Inventor: Stefan H. Schwarz, Rochester Hills, Mich.

[73] Assignee: Valeo Climate Control, Inc., Auburn Hills, Mich.

[21] Appl. No.: 08/957,828

[22] Filed: Oct. 27, 1997

[51] Int. Cl.⁶ .................................................... B60H 1/32
[52] U.S. Cl. .......................................... 454/156; 454/121
[58] Field of Search ...................... 454/121, 156, 454/159, 160, 161

[56]  References Cited

U.S. PATENT DOCUMENTS 4,742,762  5/1988  Ito et al. .............................. 454/121 X
5,152,335  10/1992  Doi et al. ............................. 454/156 X

FOREIGN PATENT DOCUMENTS 35 26 518  4/1986  Germany ................................ 454/156
35 29 940  2/1987  Germany ................................ 454/156
63-57318   3/1988  Japan ..................................... 454/156

*Primary Examiner*—Harold Joyce
*Attorney, Agent, or Firm*—Morgan & Finnegan, L.L.P.

[57]  ABSTRACT

A ventilation unit comprising: a first channel for a relatively cold air stream; a second channel for a relatively hot air stream; and an outlet door located at the ends of the first and second channels for dividing air from the first and second channels between a first outlet and a second outlet in such a way that desired proportions of each of the cold and hot air streams are divided to each of the first and second outlets.

38 Claims, 3 Drawing Sheets

VENTILATION UNIT

BACKGROUND OF THE INVENTION

This invention relates to ventilation units; for example in heating systems and air conditioning systems.

FIG. 1 shows a typical prior art air conditioning system for a vehicle. Air is drawn inwards through inlet 1 by a radial blower 2 running in a scroll 3. This forces air through evaporator 4. From the evaporator the air meets a blend door 5 which can pivot about a hinge 6. The blend door divides the airflow from the evaporator into a first (cold) stream which passes directly to a mixing chamber 7 and a second (hot) stream which passes through a heater core 8 on its way to the mixing chamber. The hot and cold air streams recombine and mix together in the mixing chamber. At the outlet of the mixing chamber is a movable panel door 9 which divides the air from the mixing chamber into a stream directed through outlet 10 towards the vehicle's panel and a remaining stream directed through passage 11 to a movable floor/defrost door 12. The floor/defrost door divides that remaining stream between the vehicle's floor and defrost outlets. The blend door 5 can be moved to control the temperature of the outgoing air by setting the amount of air in the hot and cold streams. The doors 9 and 12 are movable by a user to set the desired flow pattern in the vehicle.

For proper operation of the system the hot and cold air streams must be properly mixed by the time they reach the panel door. To achieve this the mixing chamber must be of a sufficient length. This occupies considerable space.

One aim of this invention is to reduce the space occupied by the system. Another aim is to allow a user to have the air flows to the panel vents and to the other outlets at different temperatures.

SUMMARY OF THE INVENTION

According to the present invention there is provided a ventilation unit comprising: a first channel for a relatively cold air stream; a second channel for a relatively hot air stream; and an outlet door located at the ends of the first and second channels for dividing air from the first and second channels between a first outlet and a second outlet in such a way that desired proportions of each of the cold and hot air streams are divided to each of the first and second outlets.

Preferably the outlet door has a first edge that is located in the first channel for dividing the cold air stream. The first edge may be straight or curved to achieve the desired division of the hot and cold air. Preferably the outlet door has a second edge that is located in the second channel for dividing the hot air stream. The second edge may be straight or curved to achieve the desired division of the hot and cold air. The outlet door (or at least the part of it that is operative to divide the air) may be planar or non-planar, flat or having variable thickness as needed to achieve the desired division. One preferred division is for a greater proportion of the cold air than of the hot air to be directed to the first outlet (to provide a relatively cold output air stream there) and for a greater proportion of the hot air than of the cold air to be directed to the second outlet (to provide a relatively hot output air stream there). Another preferred division is for substantially equal proportions of the cold and hot air streams to be directed to each of the first and second outlets.

The outlet door is preferably movable (most preferably rotatable) about a hinge or pivot axis. The axis is preferably located at one edge of the door. The outlet door preferably pivots about an edge opposite the said first edge, although not necessarily parallel to the first edge. The outlet door preferably achieves the said division for substantially all its positions. The air division achieved by the outlet door preferably provides air flows of substantially the same average temperature to each of the first and second outlets. Preferably volumes are provided downstream of the outlet door for allowing mixing of the air streams to each outlet.

The first and second channels preferably meet at the outlet door. At the other ends of the channels is preferably a blend door for dividing an air stream from an inlet into the cold and hot air streams. A heater is preferably located in the second channel for warming the hot air stream. The outlet door is preferably located close to the air heater and/or the blend door.

The first and second channels are preferably directed so that the hot and cold air streams meet at the mode door at a considerable angle (greater than 50° or 60° for instance, and preferably substantially at right angles). Means (such as baffles or other obstructions) may also be provided downstream of the mode door (preferably immediately downstream) to promote mixing.

A bypass channel may be provided which allows air to pass from the inlet to one of the outlets without passing through the first or second channels. The bypass channel is preferably closable to prevent air flow therethrough.

The ventilation system may form part of an air conditioning system. The ventilation system may form part of an air-conditioned or non-air-conditioned heating and/or ventilation system for a vehicle. In a vehicle the first and second outlets preferably provide air to respective locations in the vehicle, for instance facia or panel vents, floor vents or defrost vents. One of the first and second outlets most preferably provides air to facia or panel vents.

BRIEF DESCRIPTION OF THE DRAWINGS

The present invention will now be described by way of example with reference to the accompanying drawings in which.

DESCRIPTION OF THE PREFERRED EMBODIMENTS

Figure 1:
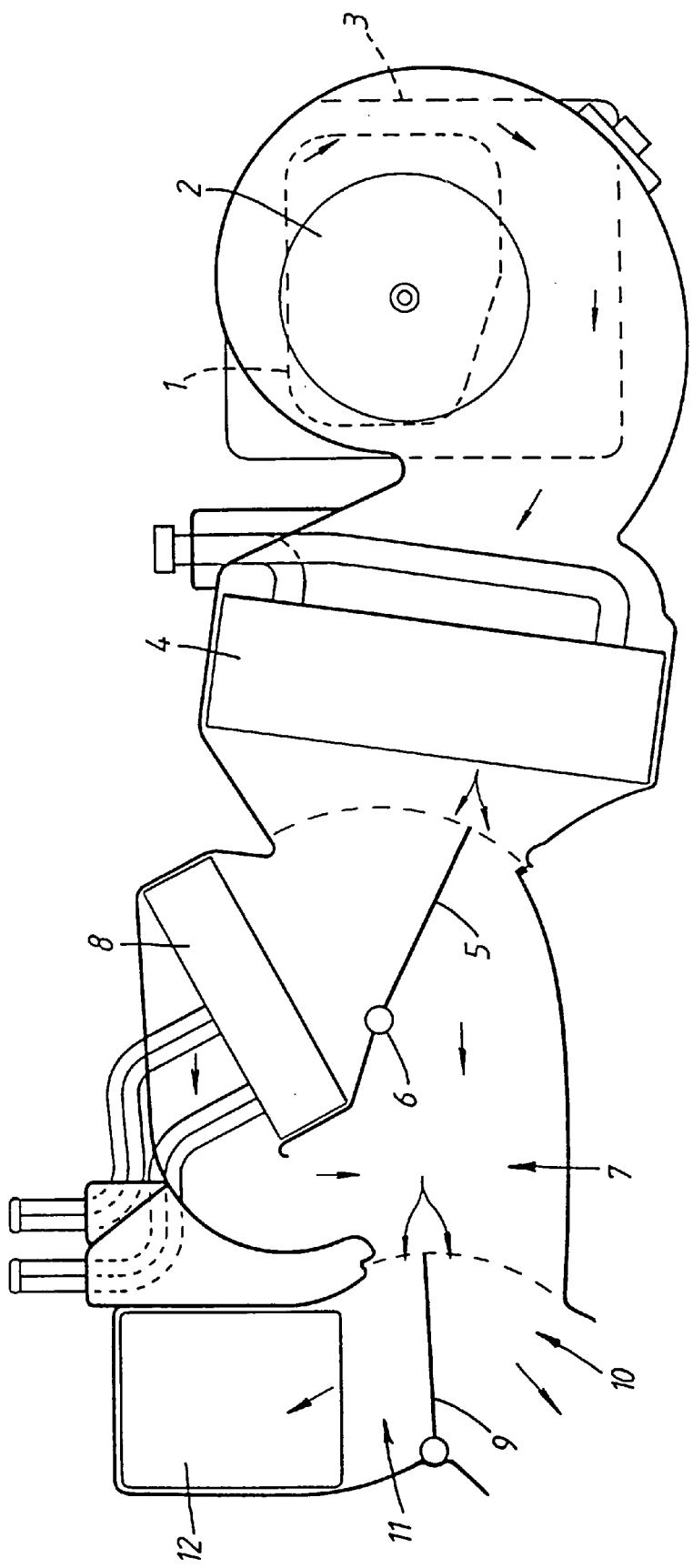
FIG. 1 shows a typical prior art air conditioning system for a vehicle.
Figure 2:
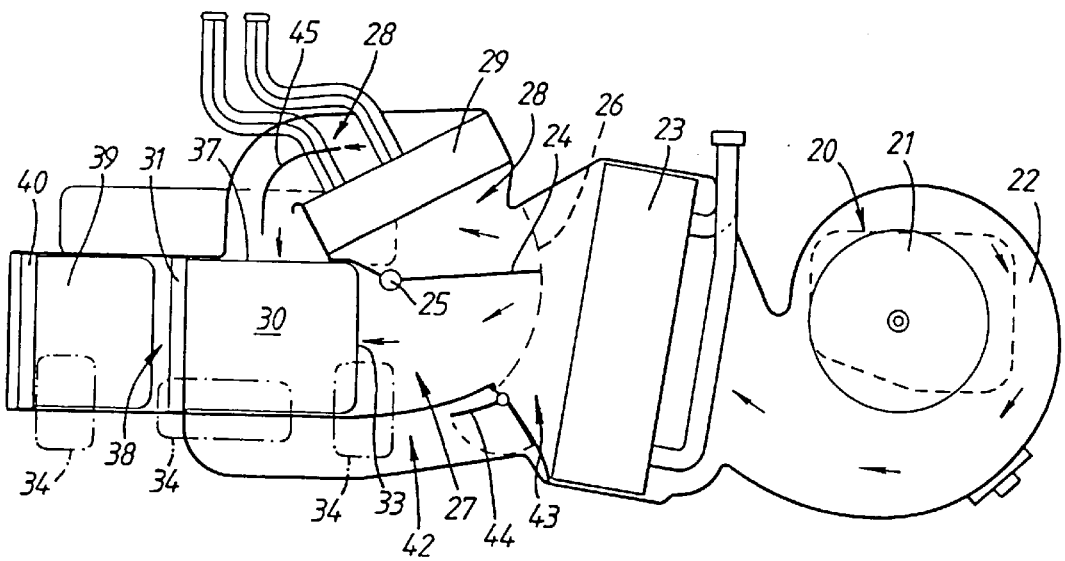
FIG. 2 shows a cross-section of a ventilation system.
Figure 3:
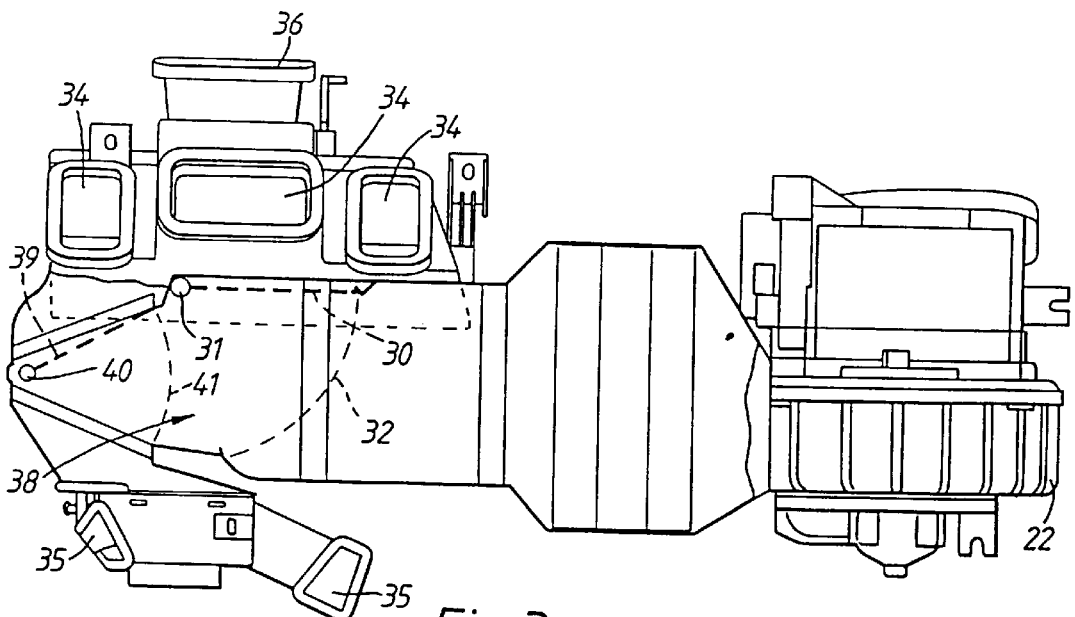
FIG. 3 shows a side view of the ventilation system of FIG. 2.

FIGS. 2 and 3 show a ventilation system which provides the air conditioning system for a vehicle. As in the system of FIG. 1, air is drawn inwards through inlet 20 by a radial blower 21 running in a scroll 22. This forces air through evaporator 23. From the evaporator the air meets a blend door 24 which can pivot about a hinge 25 as indicated by dashed line 26. The blend door divides the airflow from the evaporator into a first (cold) stream which passes through a cold air channel 27 and a second (hot) stream which passes through a hot air channel 28 where it is warmed by passing through a heater core 29.

The hot and cold air channels meet at mode door 30. The mode door pivots about hinge 31 as indicated by dashed line 32 in FIG. 3. The cold air stream in the cold air channel meets leading edge 33 of the mode door, which splits the cold air stream into two parts: one destined for the vehicle's panel vents 34 and the other destined for the vehicle's floor/defrost vents 35,36. The hot air stream in the hot air channel meets side edge 37 of the mode door, which splits the hot air stream into two parts: one destined for the vehicle's panel vents 34 and the other destined for the vehicle's floor/defrost vents 35.36. The mode door is shaped so that desired proportions of the cold and hot air streams are divided to each of the first and second outlets. In the extreme positions of the mode door all the air flow is directed to a single one of the outlets.

It is sometimes desired to have colder air at the vehicle's panel vents than at the floor/defrost vents. Therefore, one possibility is for the mode door to be shaped so as to achieve this temperature split: for instance so that in one position of the mode door roughly 60% of the cold air stream goes to the panel vents and 40% to the floor/defrost vents and roughly 40% of the hot air stream goes to the panel vents and 60% to the floor/defrost vents.

Another possibility is for the mode door to split the hot and cold air streams so that roughly equal proportions of them are directed to the panel vents and to the floor/defrost vents. The effect of this is that the air destined for the vehicle's panel vents will (when fully mixed) be roughly the same temperature as the air destined for the floor/defrost vents (when fully mixed). For example, in one position of the mode door roughly 30% of the cold air stream goes to the panel vents and 70% to the floor/defrost vents and roughly 30% of the hot air stream goes to the panel vents and 70% to the floor/defrost vents.

To promote a uniform flow in the hot air channel 28 a longitudinal wall 45 is provided in the channel, downstream of the heater core 29.

From the mode door the air flow to the floor/defrost vents passes through an intermediate channel 38 to a floor/defrost door 39. This pivots about hinge 40 (as shown by dashed line 41) and divides the air flow between the floor vents 35 and the defrost vents 36.

Because the mode door divides the air streams as required, there is no need for a mixing chamber (7 in FIG. 1). The air streams recombine and mix together in the channels downstream of the mode door as they pass to the vents—for example in the intermediate channel 38 on the way to the floor/defrost door 39. This saves space. In the embodiment shown, because the hot and cold air streams meet at a considerable angle (roughly 90°) there is turbulent flow downstream of the mode door and relatively little space is needed for mixing the air streams.

Typical dimensions of the channels are as follows:
cold air channel 27: 160 mm×120 mm,
hot air channel 28: 180 mm×80 mm.

A bypass channel 42 is provided for achieving a temperature split independently of the mode door. A bypass channel 42 passes from the chamber 43 immediately downstream of the evaporator 23 directly to the panel vent channel that leads from the mode door 30 to the panel vents. A bypass door 44 at the upstream end of the bypass channel can be opened to allow relatively cold air to pass through the bypass channel and towards the panel vent channel. In the panel vent channel the air from the bypass channel mixes with and cools the air flow from the hot and cold air channels via the mode door.

The doors are movable by a user to set the temperature and flow pattern in the vehicle. The doors could be controlled automatically.

Figure 4:
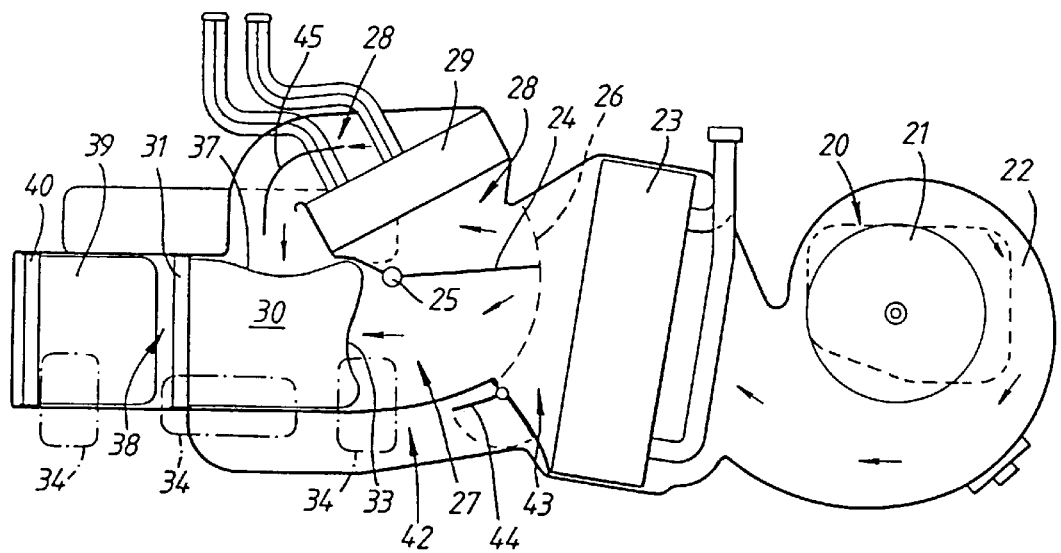
FIG. 4 shows a cross-section of another ventilation system.
Figure 5:
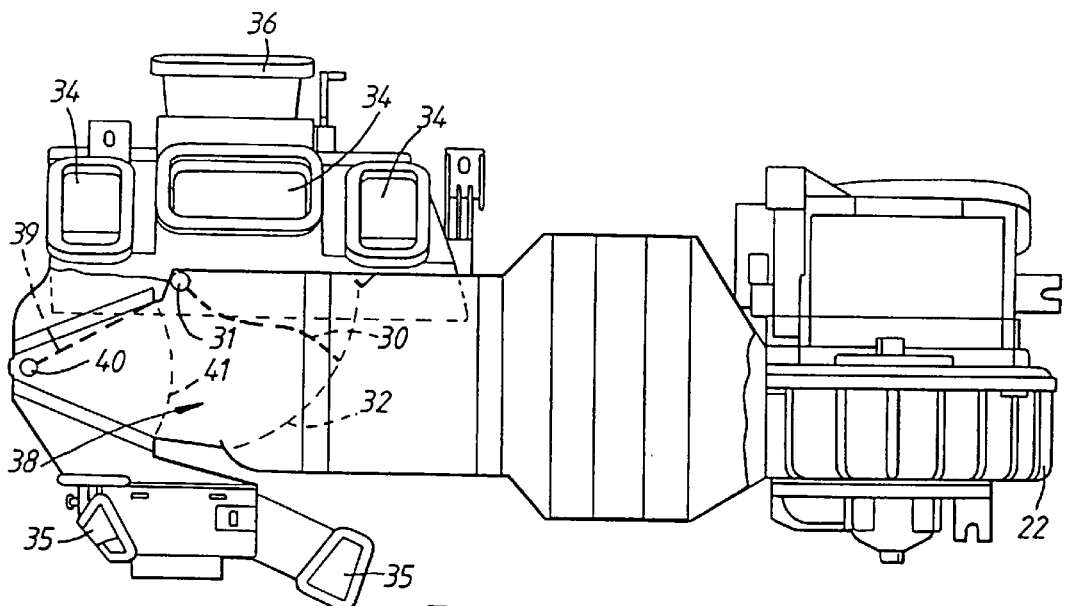
FIG. 5 shows a side view of still another ventilation system.

The shape of the mode door, its movement as the controls are altered and its location are selected to provide the desired division of air. The geometry of the channels and the flow patterns through them must also be taken into account. Most preferably the air is divided in the desired proportions for all available settings of the blend door and for all available flow rates (influenced by the vehicle's speed and the speed of the blower 21); alternatively the division could vary with the position of the mode door, for instance with relatively cooler air going to the panel vents when the mode door is set to provide a relatively large flow to the floor/defrost vents. FIGS. 4 and 5 (in which like parts are numbered as for FIGS. 2 and 3) illustrate examples of modifications to provide the desired divisions. In FIG. 4 the edges 33 and 37 of the mode door 30 are curved. In FIG. 5 the mode door 30 is non-planar. A non-planar door with one or more curved edges is possible, as is a door that has surface projections or depressions or a non-uniform thickness or other types of shaping to influence flow in the desired way.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

We claim:

1. A ventilation unit comprising:
   a first channel for a relatively cold air stream;
   a second channel for a relatively hot air stream; and
   an outlet door located at the ends of the first and second channels, the outlet door dividing cold air from the first channel between a first outlet and a second outlet in first proportion, the outlet door also dividing hot air from the second channel between the first outlet and the second outlet in a second proportion.

2. A ventilation unit as claimed in claim 1, wherein the outlet door has a first edge that is located in the first channel for dividing the cold air stream.

3. A ventilation unit as claimed in claim 2, wherein the outlet door pivots about an edge opposite the first edge.

4. A ventilation unit as claimed in claim 1, wherein the outlet door has a second edge that is located in the second channel for dividing the hot air stream.

5. A ventilation unit as claimed in claim 1, wherein the second channel includes an air heater.

6. A ventilation unit as claimed in claim 5, wherein the outlet door is located close to the air heater.

7. A ventilation unit as claimed in claim 1, comprising an air inlet and a blend door for dividing an air stream from the inlet into the cold and hot air streams.

8. A ventilation unit as claimed in claim 7, wherein the outlet door is located close to the blend door.

9. A ventilation unit as claimed in claim 1, wherein the operative portion of the outlet door is non-planar.

10. A ventilation unit as claimed in claim 1, wherein substantially equal proportions of the cold and hot air streams are divided to each of the first and second outlets.

11. The ventilation unit of claim 1, wherein the second outlet communicates with an intermediate channel, the intermediate channel having an end, said ventilation unit further comprising a second outlet door located at the end of the intermediate channel for dividing the air from the intermediate channel to a third and fourth outlet.

12. The ventilation unit of claim 11, wherein the second outlet door has a first edge that is located in the intermediate channel for dividing the air stream from the intermediate channel.

13. The ventilation unit of claim 12, wherein the second outlet door pivots about an edge opposite the first edge.

14. The ventilation unit of claim 1, further comprising a bypass channel having a first end open to the first channel and a second end open to the first outlet.

15. The ventilation unit of claim 14, wherein a bypass door is disposed in the bypass channel and located near the first end of the bypass channel, said bypass door having a first edge located in the bypass chamber that pivots about an edge opposite the first edge.

16. The ventilation unit of claim 1, wherein the first proportion is substantially equal to the second proportion.

17. An air conditioning system having a ventilation unit comprising:
 a first channel for a relatively cold air stream;
 a second channel for a relatively hot air stream; and
 an outlet door located at the ends of the first and second channels, the outlet door dividing cold air from the first channel between a first outlet and a second outlet in a first proportion, the outlet door also dividing hot air from the second channel between the first outlet and the second outlet in a second proportion.

18. A ventilation unit comprising:
 a housing defining an air inlet having a first outlet, a second outlet and a third outlet;
 a first channel having an end for a relatively cold air stream;
 a second channel having an end for a relatively hot air stream;
 an intermediate channel having an end, the intermediate channel transversely located from the first and second channels and in fluid communication with the first and second channels;
 an outlet door located at the ends of the first and second channels, the outlet door dividing cold air from the first channel between the first outlet and the intermediate channel in a first proportion, the outlet door also dividing hot air from the second channel between the first outlet and the intermediate channel in a second proportion; and
 a second outlet door located at the end of the intermediate channel for dividing air from the intermediate channel between the second outlet and the third outlet.

19. The ventilation unit of claim 18, wherein the outlet door has a first edge that is located in the first channel for dividing the cold air stream.

20. The ventilation unit of claim 18, wherein the outlet door pivots about an edge opposite the first edge.

21. The ventilation unit of claim 18, wherein the outlet door has an edge that is located in the second channel for dividing the hot stream.

22. The ventilation unit of claim 18, wherein the second channel includes an air heater.

23. The ventilation unit of claim 22, wherein the outlet door is located close to the air heater.

24. The ventilation unit of claim 18, further comprising an air inlet and a blend door for dividing an air stream from the inlet into the cold and hot air streams.

25. The ventilation unit of claim 24, wherein the outlet door is located close to the blend door.

26. The ventilation unit of claim 18, wherein the outlet door is non-planar.

27. The ventilation unit of claim 18, wherein the first proportion is substantially equal to the second proportion.

28. The ventilation unit of claim 18, wherein the second outlet door has a first edge that is located in the intermediate channel for dividing the air stream from the intermediate channel.

29. The ventilation unit of claim 28, wherein the second outlet door pivots about an edge opposite the first edge.

30. The ventilation unit of claim 18, further comprising a bypass channel having a first end open to the first channel and a second end open to the first outlet.

31. The ventilation unit of claim 30, wherein a bypass door is disposed in the bypass channel and located near the first end of the bypass channel, said bypass door having a first edge located in the bypass chamber that pivots about an edge opposite the first edge.

32. A ventilation unit comprising:
 a housing defining an air inlet having a first outlet, a second outlet and a third outlet;
 a radial blower disposed in the housing;
 an evaporator disposed in the housing and communicating with the radial blower;
 a chamber defined by the housing and disposed substantially transverse from the evaporator;
 a first channel for a relatively cold air stream having an end;
 a second channel for a relatively hot air stream having an end;
 a blend door disposed in the housing, the blend door splitting the chamber into the first channel and the second channel;
 an air heater located in the second channel;
 an intermediate channel having an end, the intermediate channel transversely located from the first and second channel and in fluid communication with the first and second channel;
 a mode door located at the ends of the first and second channels and close to the air heater and blend door, said mode door having a first edge that is located in the first channel for dividing the cold air stream between the first outlet and the intermediate channel in a first proportion and a second edge that is located in the second channel for dividing the hot air stream between the first outlet and the intermediate channel in a second proportion, said mode door pivots about an edge opposite the first edge;
 a second outlet door having a first edge located in the intermediate channel that pivots about an edge opposite the first edge for dividing the air flow from the intermediate channel between the second outlet and the third outlet;
 a bypass chamber having a first end open to the chamber defined by the housing and a second end open to the first outlet; and
 a bypass door disposed in the bypass chamber having a first edge located in the bypass chamber that pivots about an edge opposite the first edge.

33. The ventilation unit of claim 32, wherein the mode door is non-planar.

34. A ventilation unit comprising:
 means for dividing air into different proportions down a first and second channel;
 means for heating the air in one of the channels; and
 means for dividing the air from the first channel between a first outlet and a second outlet in a first proportion and for dividing air from the second channel between the first outlet and the second outlet in a second proportion.

35. The ventilation unit of claim 34, further comprising:
 means for bypassing the means for dividing;
 means for controlling inflow of air into the means for bypassing;

means for channeling the air to the first outlet.

36. A method of ventilating an air stream comprising:

dividing the air stream between a first channel and a second channel;

heating the air stream in the second channel;

dividing the air from the first between a first outlet and a second outlet in a first proportion, while dividing the heated air from the second channel between the first outlet and the second outlet in a second proportion at the same time.

37. A method of ventilating air comprising:

receiving air from outside a ventilation unit;

dividing the air between a first channel and a second channel;

heating the air in the second channel;

dividing the air from the first and second channels between a first outlet and an intermediate channel, the air from the first channel is divided between the first outlet and the intermediate channel in a first proportion, the air from the second channel is divided between the first outlet and the intermediate channel in a second proportion;

dividing the air from the intermediate channel between a second outlet and a third outlet.

38. The method of ventilating air of claim 37, further comprising:

channeling some of the air out of the first channel to the first outlet.

* * * * *